Patented Nov. 24, 1931

1,832,929

UNITED STATES PATENT OFFICE

WALTER W. EVANS, OF NEW ROCHELLE, NEW YORK, ASSIGNOR TO R. T. VANDERBILT COMPANY, INCORPORATED, OF NEW YORK, N. Y., A CORPORATION OF NEW YORK

MINERAL OIL COMPOSITION

No Drawing.   Application filed August 18, 1928.   Serial No. 300,610.

This invention relates to a mineral oil composition to be used for electrical purposes, such as the saturation of cable wrappings.

If several percent of latex is thoroughly stirred into a mineral oil, such as an oil used for electrical purposes, and the dispersion thus produced is heated to drive off water and to dissolve the rubber of the latex into the oil, a product is obtained which has improved electrical properties.

If a small percentage of a nitrogenous compound, such as a secondary amine, for example, ethylenediphenyldiamine, or a condensation product of an aldehyde with an amine, as for example, the condensation product of aldol with alphanaphthylamine, or the condensation product of aldol with ethylenediphenyldiamine is dissolved in a refined cylinder oil, the resulting composition has superior properties for electrical purposes.

I have found that a refined cylinder oil, such as that employed in the saturation of cable wrappings, may be given improved properties by mixing therewith an aqueous suspension of rubber particles, more particularly latex, and then heating to drive off the water and form a uniform solution of the rubber in the oil, and also adding thereto such a nitrogenous compound as those above mentioned. The addition of both of these ingredients gives a product with properties which would not be expected from what is known of the compositions produced by the addition of each of these compounds to a separate batch of oil.

For example, if three percent of latex, having a normal rubber content of 30–35% is thoroughly stirred into a refined cylinder oil at room temperature in such a way as to prevent agglomeration of the latex, and the colloidal dispersion thus produced is heated to 115–120° C. to drive off water, thereby producing a true solution or colloidal suspension of rubber in the oil, and three-quarters of a percent of ethylenediphenyldiamine is dissolved in the warm composition thus produced, an oil composition having valuable properties for electrical purposes is produced. The electrical properties of this oil composition could not be anticipated from a knowledge of the properties of the same cylinder oil to which three percent of latex alone had been added, or the same cylinder oil to which three-quarters of a percent of ethylenediphenyldiamine alone had been added.

If this oil composition is employed as a saturant for cable wrappings, a cable made from such wrappings has been found to have a different resistivity from a similar cable made from wrappings in which the saturant is an untreated oil, an oil containing three-quarters of a percent of ethylenediphenyldiamine, or an oil composition prepared by heating a thoroughly stirred mixture of oil and three percent latex.

Cables of similar construction employing these different saturants were tested when fresh, and after aging several days at 100° C. to determine the resistivity of the various cables and the power factor of similar circuits employing such cables. The results are tabulated below:

|  | Resistivity in ohm-centimeters $\times 10^{12}$ | |
|---|---|---|
|  | Fresh | Aged 10 days |
| Untreated oil | 3.0 | .33 |
| Oil + 3% latex | 16.0 | .85 |
| Oil + ¾% E. D. D. | 9.0 | 1.3 |
| Oil + 3% latex and ¾% E. D. D. | 8.2 | 2.3 |

|  | Power factor | |
|---|---|---|
|  | Fresh | Aged 7 days |
| Untreated oil | .064 | .130 |
| Oil + 3% latex | .011 | .027 |
| Oil + ¾% E. D. D. | .015 | .032 |
| Oil + 3% latex and ¾% E. D. D. | .012 | .016 |

Rubber is not readily soluble in oil so that ordinarily prolonged heating is necessary to effect solution. This causes more or less depolymerization of the rubber. The process of this invention involves the thorough stirring of a watery suspension of fine rubber particles into the oil followed by heating to cause solution of these suspended particles into the oil. Solution is effected without prolonged heating so that the product is substantially free from those depolymerization products which accompany prolonged heating.

Instead of dissolving the latex in the oil and adding the ethylenediphenyldiamine to the product, this diamine may first be added to the oil and then the latex dissolved therein. The diamine may be dissolved in the oil by warming or may be added in solution in a suitable organic solvent such as benzol, the benzol being later evaporated from the composition.

Instead of ethylenediphenyldiamine, other nitrogenous compounds may be added to the oil and latex composition with similar results. For example, condensation products of aldehyde and amines, such as the condensation products of aldol and alphanapthylamine, or the condensation product of aldol with ethylenediphenyldiamine may be employed.

Nitrogen-containing substances, such as these, which when dissolved in an oil composition prepared from latex or other similar aqueous suspension of rubber in oil, as above described, produce an oil composition with electrical properties superior to what would be anticipated from a knowledge of the electrical properties of oil compositions similarly prepared from the oil and an aqueous suspension of rubber or the oil and the nitrogen-containing substance alone, are referred to in the claims as "nitrogenous modifiers."

I claim:

1. The method of producing a composition comprising oil as the predominating ingredient which comprises dissolving finely dispersed particles of rubber latex and a nitrogenous modifier in a mineral oil.

2. The method of producing a composition comprising oil as the predominating ingredient which comprises dissolving a nitrogenous modifier in a mineral oil and stirring rubber latex into the oil and heating the mixture until the latex dissolves.

3. The method of producing a composition comprising oil as the predominating ingredient which comprises adding several percent of latex and a small amount of a nitrogenous modifier to a mineral oil and heating the oil to drive off the water content and dissolve the nitrogenous modifier and rubber of the latex therein.

4. The method of producing a composition comprising oil as the predominating ingredient of superior value for electrical purposes, which comprises thoroughly stirring about three percent of latex in a refined cylinder oil, heating to about 115–120° C. to drive off the water content, and dissolving a nitrogenous modifier therein.

5. A composition for electrical purposes, comprising a mineral oil as the predominating ingredient, a secondary diamine and particles of rubber latex dissolved in the oil, said composition being substantially free from the depolymerization products produced by the prolonged heating of rubber in oil.

6. A composition for electrical purposes, comprising a mineral oil as the predominating ingredient, a condensation product of an aldehyde with an amine and particles of rubber latex dissolved in the oil, said composition being substantially free from the depolymerization products produced by the prolonged heating of rubber in oil.

7. A composition for electrical purposes comprising a mineral oil as the predominating ingredient, a nitrogenous modifier and particles of rubber latex dissolved in the oil.

8. A composition for electrical purposes comprising a mineral oil as the predominating ingredient and having ethylenediphenyldiamine and ingredients of rubber latex dissolved therein.

9. A composition comprising a mineral oil as the predominating ingredient, a nitrogenous modifier, and ingredients of latex, except water.

10. A composition comprising a mineral oil as the predominating ingredient, a condensation product of an aldol with an amine, and ingredients of latex, except water.

In testimony whereof I affix my signature.

WALTER W. EVANS.